[19] United States Patent
Cohen

[11] 4,304,887
[45] Dec. 8, 1981

[54] ETHYLENE/CARBOXYLIC ACID COPOLYMERS

[75] Inventor: Gordon M. Cohen, Wilmington, Del.

[73] Assignee: E. I. Du Pont de Nemours and Company, Wilmington, Del.

[21] Appl. No.: 887,330

[22] Filed: Mar. 16, 1978

[51] Int. Cl.$^3$ ............................................. C08F 8/42
[52] U.S. Cl. ................................. 525/329; 525/328; 525/360
[58] Field of Search ............... 526/4, 47, 317, 318, 526/14, 16; 260/45.75 G; 525/329, 360

[56] References Cited

U.S. PATENT DOCUMENTS

| 3,245,968 | 4/1966 | Dipner | 260/45.75 G |
| 3,249,570 | 5/1966 | Potts | 526/317 |
| 3,267,083 | 8/1966 | Imhof | 526/14 |
| 3,332,926 | 7/1967 | Baron | 526/47 |
| 3,459,703 | 8/1969 | Briggs | 260/45.75 G |
| 3,904,588 | 9/1975 | Greene | 526/15 |
| 4,038,228 | 7/1977 | Taylor | 526/4 |

Primary Examiner—Paul R. Michl

[57] ABSTRACT

Improved mill release properties and green strength of elastomeric copolymers derived from ethylene, alkyl acrylates or vinyl esters of carboxylic acids, and $\alpha,\beta$-unsaturated mono- or dicarboxylic acids, and optionally containing segments derived from carbon monoxide, sulfur dioxide or acrylonitrile, is achieved by including in such copolymers a small quantity of certain chromium (III) compounds.

21 Claims, No Drawings

ETHYLENE/CARBOXYLIC ACID COPOLYMERS

DESCRIPTION

1. Technical Field

This invention relates to elastomeric copolymers derived from ethylene, alkyl acrylates or vinyl esters of carboxylic acids, and $\alpha,\beta$-unsaturated mono- or dicarboxylic acids, optionally additionally containing segments derived from carbon monoxide, sulfur dioxide or acrylonitrile and the improvement of certain properties thereof. In particular, this invention relates to the improvement of the mill release properties, i.e., to minimizing or eliminating sticking of such polymers when mill release is desired, and to the improvement of the green strength of such polymers.

2. Background Art

U.S. Pat. No. 3,904,588, granted Sept. 9, 1975, to Greene, discloses and claims certain ethylene/alkyl acrylate/carboxylic acid elastomeric terpolymers which have certain particularly desirable properties. In particular, Greene is directed to elastomeric terpolymers derived from ethylene, methyl or ethyl acrylate, and an alkyl ester of 1,4-butene-dioic acid, which terpolymer possesses exceptional oil resistance and low temperature properties that render it particularly suitable for certain industrial applications. Greene, however, is silent on mill release properties, green strength and the improvement thereof.

U.S. Pat. No. 3,267,083, granted Aug. 16, 1966, to Imhof, discloses that certain polyolefin-based polymers containing in their backbones pendant acid groups, such as carboxyl groups, can be reversibly, or ionically, crosslinked with certain metal oxides and polyvalent metal salts to provide reprocessable polyolefin systems. Included among the various polymers contemplated by Imhof are ethylene/alkyl acrylate/acrylic acid terpolymers; and included among the various metal oxides and polyvalent metal salts contemplated by Imhoff are polyvalent metal alkanoates, including chromium alkanoates. Imhof, however, does not distinguish between ethylene/acrylate/acid terpolymers on the one hand, and other polyolefin-based polymers containing in their backbone pendant acid groups, on the other. More importantly, Imhof does not distinguish between chromium alkanoates and all of the various other metal oxides and polyvalent metal salts, nor does Imhof disclose that any one or more of these materials would improve the mill release properties or green strength of ethylene/acrylate/acid terpolymers.

DISCLOSURE OF THE INVENTION

The present invention relates to elastomeric copolymers derived from ethylene, alkyl acrylates or vinyl esters of carboxylic acid, and $\alpha,\beta$-unsaturated mono- or dicarboxylic acids, optionally additionally containing segments derived from carbon monoxide, sulfur dioxide or acrylonitrile and the improvement of certain properties of such polymers. In particular, the present invention relates to improved elastomeric copolymers of the type described generally above, and in more detail below, to the process of preparing such improved elastomeric copolymers, and to articles made from such improved elastomeric copolymers.

It has been found that the mill release properties and green strength of the elastomeric terpolymers of the general type described by Greene in U.S. Pat. No. 3,904,588 can be significantly improved by incorporating into such elastomeric copolymers a small quantity of certain chromium (III) (i.e., trivalent chromium) compounds. More specifically, it has been found that sticking when mill release is desired can be minimized or eliminated, and green strength can be improved in elastomeric copolymers derived from ethylene, alkyl acrylates or vinyl esters or carboxylic acids, and $\alpha,\beta$-unsaturated mono- or dicarboxylic acids, optionally additionally containing segments derived from carbon monoxide, sulfur dioxide or acrylonitrile, by incorporating into such copolymers a small quantity of a chromium (III) compound selected from the group consisting of chromium (III) carboxylates of the formula $(RCOO)_3Cr$ where R is $C_1$–$C_{20}$ acrylic alkyl or $C_3$–$C_{20}$ acyclic alkenyl in which the $\alpha$-carbon is saturated, and tris(2'-hydroxyacetophenono)chromium. This is accomplished without significantly adversely affecting the superior heat aging properties and compression set of Green's terpolymers, which is generally the case with respect to such polymers to which has been added various other metal salts.

By "mill release" is meant the ability to remove a polymer with ease and in a single piece from surfaces of rubber processing equipment such as the roll of a rubber mill or the mixing cavity and blades of an internal mixer. When mill release is poor the material will have to be removed with more than the usual force and/or will have to be removed in several pieces rather than in a single continuous sheet or lump.

"Green strength" is a measure of the strength or modulus of an elastomer-containing composition prior to vulcanization. In compositions based on the polymers of the present invention, it shows a positive correlation with the bulk viscosity of the composition. For example, a compound of a given copolymer of the present invention of Mooney viscosity $(ML_{1+4})$ 40 (ASTM D1646) at 100° C. would possess a green strength greater than that of a similar compound of Mooney viscosity 20.

As mentioned, the base polymer derives from ethylene, alkyl acrylates or vinyl esters of carboxylic acids, and $\alpha,\beta$-unsubstituted mono- or dicarboxylic acids. In addition, it may also contain segments derived from carbon monoxide, sulfur dioxide or acrylonitrile.

The ethylene comprises 25–70 weight percent of the polymer, preferably 35–65 weight percent.

The alkyl acrylate or the vinyl esters of carboxylic acids comprise 25–70 weight percent of the polymer, preferably 30–60 weight percent. Alkyl acrylates suitable for use in the polymer of the present invention include $C_1$–$C_8$ alkyl esters of acrylic acid, for example, the methyl, ethyl, isobutyl, hexyl and 2-ethylhexyl esters. Methyl and ethyl acrylates are preferred. Methyl acrylate is most preferred. Vinyl esters of carboxylic acids suitable for use in the composition of the present invention include vinyl esters of carboxylic acids having 2–8 carbon atoms, for example, vinyl acetate, vinyl propionate, vinyl hexanoate and vinyl 2-ethylhexanoate. Vinyl acetate is preferred.

The $\alpha,\beta$-unsaturated mono- or dicarboxylic acids are present in an amount sufficient to provide 0.1–10 weight percent, preferably 0.5–5.0 weight percent of —COOH groups. Suitable $\alpha,\beta$-unsaturated mono- or dicarboxylic acids include those having 3–12 carbon atoms, for example, the monocarboxylic acids, acrylic, methacrylic and ethacrylic, the dicarboxylic acids, itaconic, maleic and fumaric, and the monoesters of dicarboxylic acids ethyl hydrogen maleate, ethyl hydrogen fumarate and 2-ethylhexyl hydrogen maleate. Acrylic acid, methacrylic acid and ethyl hydrogen maleate are preferred.

The copolymers of the present invention may also contain up to 15 weight percent of an additional monomer selected from the group consisting of carbon monoxide, sulfur dioxide and acrylonitrile.

Examples of copolymers which can be improved by incorporation of a small amount of certain chromium (III) compounds include the following:
ethylene/ethyl hydrogen maleate/methyl acrylate copolymers
ethylene/acrylic acid/vinyl acetate copolymers
ethylene/methacrylic acid/methyl acrylate copolymers
ethylene/fumaric acid/methyl acrylate copolymers
ethylene/methacrylic acid/vinyl acetate copolymers
ethylene/ethyl hydrogen maleate/vinyl acetate copolymers
ethylene/ethyl hydrogen maleate/carbon monoxide/methyl acrylate copolymers
ethylene/methacrylic acid/carbon monoxide/vinyl acetate copolymers
ethylene/ethyl hydrogen maleate/carbon monoxide/vinyl acetate copolymers
ethylene/methacrylic acid/sulfur dioxide/vinyl acetate copolymers
ethylene/ethyl hydrogen maleate/acrylonitrile/methyl acrylate copolymers.

Especially preferred are copolymers containing 35–47 weight percent ethylene, 50–60 weight percent methyl acrylate and 3–5 weight percent ethyl hydrogen maleate. (The stated quantity of ethyl hydrogen maleate corresponds to 0.93–1.55 weight percent of —COOH groups.)

As indicated above, the mill release properties and green strength of the elastomeric copolymers described above can be significantly improved by incorporating into such polymers a small quantity of certain chromium (III) compounds. In particular, these properties can be significantly improved by incorporating 1–20, preferably 1–7, milliequivalents of certain chromium (III) compounds per 100 grams of the copolymer.

Suitable chromium (III) compounds include chromium (III) carboxylates of the formula

(RCOO)$_3$Cr where R is an acyclic alkyl group of 1–20 carbon atoms or an acyclic alkenyl group of 3–20 carbon atoms in which the α-carbon is saturated, i.e., the α-carbon is connected through three single bonds to hydrogen or carbon atoms. An additional suitable chromium (III) compound is tris(2'-hydroxyacetophenono)chromium. Examples of suitable carboxylates include acetate, propionate, 2-ethylhexanoate and other octanoates, neodecanoate, dodecanoate, 9-dodecenoate, oleate, palmitate and stearate. The preferred chromium (III) compounds are commercially available and include the 2-ethylhexanoate, oleate and neodecanoate. The most preferred chromium (III) compound is chromium (III) 2-ethylhexanoate. The neodecanoate can be prepared from neodecanoic acid, which is a mixture of branched carboxylic acids of ten carbon atoms and is available from Enjay Chemical Co., Houston, Tex.

To achieve maximum benefit in the copolymer, the chromium (III) compound should be well dispersed and at least partially soluble in the copolymer. Thus, the preferred chromium carboxylates are those commercially available in the form of liquids or soft pastes in which the chromium carboxylate can be dissolved and/or suspended in a fluid such as mineral spirits or in an excess of the corresponding carboxylic acid. In such form they are readily admixed with ethylene copolymers. If a solid chromium compound is used instead, it is most effective if finely divided or, preferably, dissolved in a small amount of solvent. For example, chromium (III) acetate is conveniently added as its aqueous solution.

In addition to the above, it has further been found that the degree of improvement in mill release properties and green strength can be influenced by the mode of addition of the chromium (III) compound to the copolymer. Best results are achieved when the chromium (III) compound is added in such a fashion as to permit it to become evenly distributed throughout the polymer before any substantial degree of chemical interaction between the chromium (III) compound and the polymer has occurred.

In particular, the chromium (III) compound can be mixed with the copolymer by conventional compounding techniques using standard equipment such as rubber mills and internal mixers. Best results are generally obtained by adding the chromium (III) compound to the copolymer at room temperature or near the lowest temperature at which the copolymer is sufficiently plastic for mixing to take place. Thus, when using a rubber mill as the mixing device, the chromium (III) compound should be added near the lowest temperature at which a given copolymer will band on the mill. With the preferred copolymers, banding on the mill can be accomplished at room temperature (20°–30° C.) or slightly elevated temperatures (30°–50° C.). While the beneficial effects of the chromium (III) compound are still evident when it is added at higher temperatures, the resulting polymer generally does not achieve the full benefit of the added chromium (III) compound; that is, the polymer may still exhibit some tendency to stick to the mill. Temperature is less important in internal mixers; however, when using an internal mixer, the chromium (III) compound is preferably added early in the mixing cycle before the temperature of the copolymer has been significantly increased by the mechanical shear applied to it by the mixer. The time required for interaction of the chromium (III) compound with the copolymer is largely dependent on the temperature and the efficiency of the mixing device employed. Mixing cycles of 2–10 minutes at about 100° C.–130° C. are usually adequate with mills or internal mixers. Longer times may be required at lower temperatures. Other materials such as fillers, plasticizers, antioxidants and release agents can be incorporated into the polymer by adding the same thereto prior to, simultaneously with, or subsequent to the addition of the chromium (III) compound, if desired.

The elastomeric polymers of the present invention can be cured and compounded as discussed by Greene in U.S. Pat. No. 3,904,588. For example, it is stated there that such polymers can be vulcanized in the presence of amine curing systems, such as hexamethylenediamine, hexamethylenediamine carbamate, tetramethylenepentamine, hexamethylenediaminecinnamaldehyde adduct, as well as hexamethylenediaminedibenzoate salt. Aromatic amines can also be used as curing agents. Examples of typical suitable amine curing system recipes are also given in Greene; see, for example, Table II therein.

The vulcanizates of the present invention may also contain an antioxidant system based on a phosphorus ester antioxidant, a hindered phenolic antioxidant, an amine antioxidant, or a mixture of two or more of these compounds. The phosphorus ester compound can be, for example:
tri(mixed mono- and dinonylphenyl)phosphite,
tris(3,5-di-t-butyl-4-hydroxyphenyl)phosphate,
high molecular weight poly(phenolic phosphonates), and
6-(3,5-di-t-butyl-4-hydroxy)benzyl-6H-dibenz-[c,e][1,2]oxaphosphorin-6-oxide.

The hindered phenolic compounds include, for example, the following:
4,4-butylidenebis(6-t-butyl-m-cresol,
1,3,5-trimethyl-2,4,6-tris-(3,5-di-t-butyl-4-hydroxybenzyl)benzene,
2,6-di-t-butyl-α-dimethylamino-p-cresol, and
4,4'-thiobis-(3-methyl-6-t-butylphenol).

Suitable amine antioxidants include, among others, the following: polymerized 2,2,4-trimethyl-1,2-dehydroquinoline; N-phenyl-N'-(p-toluenesulfonyl)-p-phenylenediamine; N,N'-di(β-naphthyl)-p-phenylenediamine; low temperature reaction product of phenyl (β-naphthyl)amine and acetone; and 4,4'-bis-(α,α-dimethylbenzyl)diphenylamine.

The proportion of the antioxidant compound in the vulcanizing composition is 0.1–5 parts per 100 parts of polymer, the preferred proportion being 0.5–2.5.

The antioxidant improves the heat aging of the compositions. The antioxidant effect is usually quite low below the preferred range and impractically low below the broad range recited above. Above the higher limits, little additional improvement is observed, and there may be adverse effects on the state of cure. The weight ratio of the phenolic or amine antioxidant to the phosphorus compound in the mixtures is about 0.5–3, the preferred ratio being about 1.

The preferred antioxidant compositions contain tri(mixed mono and dinonylphenyl)phosphite in mixture with either 4,4'-bis(α,α-dimethylbenzyl)diphenylamine or 4,4'-butylidenebis(6-t-butyl-m-cresol).

It is often desirable to add fillers to reduce cost and to improve mechanical properties. A typical vulcanized composition will usually contain about 15–40 volume percent of fillers, for example, carbon black, barium sulfate, magnesium silicate, or silica. Other conventional fillers can also be used. The preferred proportion of the fillers is 20–25 volume percent, and also depends on the reinforcing effect of the individual fillers. Below the lower limit, the improvement of tensile properties is quite low, while above the upper limit, the heat aging resistance of the polymer is adversely affected.

The following examples identify various specific elastomeric copolymers of the present invention and their relative mill release properties and green strength. The relative mill release properties are evaluated by determining whether a given sample can be removed from a mill under specified conditions without sticking. The relative green strength is evaluated by measuring the Mooney viscosity in accordance with ASTM D-1646. Melt index is determined in accordance with ASTM D-1238, 190° C., 2160 grams load.

In addition to providing an evaluation of the improved properties of the elastomeric polymers of the present invention, the examples also illustrate that these improved properties are not achieved in compositions outside the scope of the present invention, including equivalent polymers with no metal added as well as equivalent polymers with added metal compounds other than the chromium (III) compounds specified above as suitable.

EXAMPLE 1

A black masterbatch containing 16 parts of carbon black, SRF-NS(N-774), 1.6 parts of poly(ethyleneoxy)-glycol, molecular weight 4000, 0.8 part 4,4'-bis(α,α-dimethylbenzyl)diphenylamine, 0.8 part tri(mixed mono- and dinonylphenyl)phosphite, and 81 parts of an ethylene copolymer prepared by high pressure bulk polymerization (42 weight percent ethylene, 54 weight percent methyl acrylate, and 4 weight percent ethylhydrogen maleate, melt index at 190° C. approximately 9 g/10 min.) was treated with several organometallic salts on a 2-roll rubber mill. The salts were mixed into the polymer on the unheated mill. The mixture was then heated for 5 min. at a mill temperature of 125° C. to effect a chemical reaction. Whenever possible, mixing was continued at 125° C. by folding over flaps of rubber produced by cutting diagonally across the band of polymer on the mill roll.

Table I lists the salts and the quantity (in parts per 100 parts of polymer and milliequivalents per 100 grams of polymer) used to treat the masterbatch and their effects on polymer bulk viscosity, i,e, Mooney viscosity ($ML_{1+4}$ at 100° C.), and on adhesion to the heated mill rolls. If adhesion is so great that flaps cannot be cut and folded over as described above, it is specified that the mixture cannot be "worked". If the stock can be removed at 125° C., it is so indicated. The data demonstrates that only chromium (III) 2-ethylhexanoate provides a stock that can be worked and removed at 125° C. Chromium (III) 2-ethylhexanoate also gives a bulk viscosity greater than that obtained with equal or higher quantities of the other metal salts.

TABLE I

METAL SALT TREATMENT OF TERPOLYMER MASTERBATCH

| Metal Salt | Parts | Milli-equivalents | Workable | Removable | Mooney Viscosity |
|---|---|---|---|---|---|
| Chromium(III) 2-ethyl hexanoate[1] | 0.56 | 2.6 | Yes | Yes | 38 |
| Cobalt 2-ethyl-hexanoate[2] | 0.56 | 2.3 | No | No | 20 |
| n-Butyltin hydroxide oxide | 0.56 | 10.8 | No | No | 30 |
| Nickel acetylacetonate | 0.56 | 4.4 | No | No | 22 |
| Titanium(IV) butoxide[3] | 0.75 | 8.8 | No | No | 24 |
| Titanium(IV) (di-i-propoxide) bis(2,4-pentanedionate)[4] | 0.75 | 6.2 | No | No | 28 |

[1] 8% by weight of chromium
[2] 12% by weight of cobalt
[3] 14.1% by weight of titanium
[4] 9.9% by weight of titanium

EXAMPLE 2

Black masterbatches, containing different metal salts were prepared with the compositions shown in Table II from an ethylene/methyl acrylate/methacrylic acid terpolymer produced by a high pressure bulk polymerization process. All ingredients were mixed into the polymer on an unheated 2-roll rubber mill. The compounded stocks were then heated for 5 min. at a mill temperature of 125° C. to effect a chemical reaction.

Whenever possible, mixing was continued at 125° C. by folding over flaps of rubber produced by cutting diagonally across the band of polymer on the mill roll.

Table II lists the masterbatch recipes and the effects of the various metals on polymer bulk viscosity and adhesion to the heated mill rolls. Sticking is indicated by an inability at 125° C. to cut flaps in the stock (as above) and to remove the stock from the mill after the 5 minute reaction time.

The data demonstrate that only chromium (III) 2-ethylhexanoate produces a stock which can be worked and removed at 125° C. Chromium, alone, gives a bulk viscosity significantly higher than the metal-free control sample.

TABLE II

METAL SALT TREATMENT OF TERPOLYMER[1] MASTERBATCH

|  | A | B | C | D |
|---|---|---|---|---|
| A. Recipe | | | | |
| Ethylene/methyl acrylate/ methacrylic acid (g) | 100 | 100 | 150 | 150 |
| SRF Black, N-774 (g) | 20 | 20 | 30 | 30 |
| Poly(ethyleneoxy) glycol, mol. wt. 4000 | 2.0 | 2.0 | 3.0 | 3.0 |
| 4,4'-bis($\alpha,\alpha$-dimethylbenzyl)-diphenylamine | 1.0 | 1.0 | 1.5 | 1.5 |
| Tri(mixed mono- and dinonylphenyl) phosphite | 1.0 | 1.0 | 1.5 | 1.5 |
| Chromium(III) 2-ethylhexanoate[2] (g) | — | 1.0 | — | — |
| Sodium Stearate (g) | — | — | 4.5 | — |
| Zinc Oxide (g) | — | — | — | 1.5 |
| Millieq. metal/100 g polymer | — | 3.2 | 14.8 | 36.9 |
| B. Bulk Properties | | | | |
| Sticking to Heated Mill (125° C.) | Yes | No | Yes | Yes |
| Mooney Viscosity $ML_{1+4}$ at 100° C. | 15 | 74 | 16 | 16 |

[1]Ethylene/methyl acrylate/methacrylic acid in a weight ratio of 45/53/2 and with a melt index of 9 g/10 min. at 190° C.
[2]5.5% by weight of chromium (III).

EXAMPLE 3

Black rubber masterbatches of increasing bulk viscosities were prepared according to the recipes in Table III below, in a water-cooled 3D Banbury internal mixer. The mixer was charged by adding about half of the terpolymer first, then all of the compounding ingredients and finally the remaining terpolymer. The temperature of the mixer cavity was in the range of 40°–50° C. during charging. It can be seen from Table III that increasing levels of the chromium (III) 2-ethylhexanoate additive progressively elevate the bulk viscosity of the masterbatch. Despite the use of the organometallic salt, none of the masterbatches adhered strongly to the 2-roll mill placed under the mixing chamber to catch and band the hot material exiting the Banbury.

TABLE III

PREPARATION OF BLACK RUBBER MASTERBATCHES OF VARYING VISCOSITY

|  | A | B | C | D |
|---|---|---|---|---|
| A. Recipe | | | | |
| Ethylene/methyl acrylate/ ethyl hydrogen maleate (g)[1] | 43,100 | 43,100 | 43,100 | 43,100 |
| SRF Black, N-774 (g) | 8,620 | 8,620 | 8,620 | 8,620 |
| Poly(ethyleneoxy) glycol, mol. wt. 4000 | 862 | 862 | 862 | 862 |
| 4,4'-bis($\alpha,\alpha$-dimethylbenzyl)diphenylamine | 431 | 431 | 431 | 431 |
| Tri(mixed mono- and dinonylphenyl) phosphite | 431 | 431 | 431 | 431 |
| Chromium 2-ethylhexanoate (g)[2] | 0 | 217 | 323 | 431 |
| Millieq. Cr/100 g polymer | 0 | 1.6 | 2.4 | 3.2 |
| B. Mixing Conditions | | | | |
| Banbury Rotor Speed (rpm) | 40 | 35 | 35 | 35 |
| Mixing time (min.) | 6 | 4 | 4 | 5 |
| Cavity temperature at end of mix (°C.) | 121 | 132 | 130 | 130 |
| C. Bulk Viscosity of Masterbatch | | | | |
| Mooney Viscosity, $ML_{1+4}$ at 100° C. | 18 | 28 | 34 | 46 |

[1]By weight, the terpolymer contains 42% ethylene, 54% methyl acrylate, and 4% ethyl hydrogen maleate.
[2]5.5% by weight of chromium (III).

EXAMPLE 4

The black rubber masterbatch described in Example 1 was treated with various levels of several carboxylic acid salts of chromium (III) and by the 2'-hydroxyacetophenone chelate of Cr. The additives were mixed into the masterbatch (about 185 g) on a 2-roll 4"×8" rubber mill without heating. In the case of the acetic acid salt, an aqueous solution of the additive was mixed into the masterbatch at a mill temperature of about 60° C. The mixtures were heated on the mill for 5 minutes at 125° C., to effect a chemical reaction.

In Table IV, the effect on bulk viscosity, i.e., Mooney viscosity ($ML_{1+4}$ at 100° C.) and adhesion of the masterbatch is noted. Sticking is indicated by an inability at 125° C. to cut flaps in the stock to be folded over on the mill to effect continued mixing. It is also indicated by the inability to remove the stock from the mill at the reaction temperature. The quantity of chromium is given in parts per 100 parts of polymer and milliequivalents per 100 grams of polymer.

From the data, it can be seen that at very low levels of chromium (0.8 milliequivalents of Cr per 100 grams of polymer) sticking can occasionally occur. Where this adhesion problem occurs, the bulk (Mooney) viscosity is not significantly different from untreated polymer. At slightly higher levels the adhesion problem does not occur.

TABLE IV

EFFECT OF SEVERAL CHROMIUM (III) COMPOUNDS ON MASTERBATCH[1] VISCOSITY AND HOT MILL ADHESION

| Cr (III) Compound | Parts | Milli-equivalents | Sticking | Mooney Viscosity |
|---|---|---|---|---|
| None | — | — | No | 15 |
| Chromium neodecanoate, 5% Cr | 0.27 | 0.78 | No | 14½ |
| " | 0.53 | 1.5 | No | 15½ |
| " | 1.5 | 4.3 | No | 52 |
| Chromium 2-ethylhexanoate, 5.5% Cr. | 0.27 | 0.86 | No, Yes | 19,16 |
| Chromium 2-ethylhexanoate, 5.5% Cr. | 0.53 | 1.7 | No | 20 |
| Chromium 2-ethylhexanoate, 5.5% Cr. | 1.0 | 3.2 | No | 34 |
| Chromium Oleate, 4.5% Cr | 0.33 | 0.86 | Yes | 18½ |
| " | 1.0 | 2.6 | No | 20½ |
| " | 1.5 | 3.9 | No | 39 |
| Chromic Acetate[2] (in water) | 0.13 | 1.6 | No | 15½ |

TABLE IV-continued
EFFECT OF SEVERAL CHROMIUM (III) COMPOUNDS ON MASTERBATCH[1] VISCOSITY AND HOT MILL ADHESION

| Cr (III) Compound | Parts | Milli-equivalents | Sticking | Mooney Viscosity |
|---|---|---|---|---|
| " | 0.33 | 4.0 | Slight | 20½ |
| " | 1.0 | 12.1 | No | 126 |
| Tris(2'-hydroxyacetophenono)chromium | 0.13 | 0.85 | No | 14½ |
| Tris(2'-hydroxyacetophenono)chromium | 0.67 | 4.4 | No | 50 |
| Tris(2'-hydroxyacetophenono)chromium | 1.0 | 6.5 | No | 90 |
| Chromium stearate[3] | 0.25 | 0.79 | No | 18½ |
| " | 1.2 | 3.8 | No | 21½ |
| " | 3.7 | 11.7 | No | 43½ |

[1]Terpolymer contains, by weight 42% ethylene, 54% methyl acrylate, and 4% ethyl hydrogen maleate. The acid content is approximately 35 meq/100 g of polymer.
[2]Fisher Scientific Co., Cr(C$_2$H$_3$O$_2$)$_3$ · H$_2$O formula weight = 247.2.
[3]Pfaltz and Bauer, 95% pure by weight.

EXAMPLE 5

The same procedure used in Example 1 was followed to mix and cause the reaction of various metal salt additives with the black rubber masterbatch described in that example.

In Table V are listed the salts and the quantity (in parts per 100 parts of polymer and milliequivalents per 100 grams of polymer) used to treat the masterbatch and their effects on polymer bulk viscosity and adhesion to the heated mill rolls. Only chromium (III) 2-ethylhexanoate produces Mooney viscosities in the 40 Mooney range at very low additive levels, without causing the stock to stick to the heated mill rolls. Some salts, such as ferric 2-ethylhexanoate, zirconium 2-ethylhexanoate and stannous 2-ethylhexanoate, cause such a large viscosity rise at higher additive levels that the stocks do not stick to the mill rolls; however, these stocks have a viscosity too high to allow routine processing. Among the salts listed in Table V, at metal concentrations of about 3.5 milliequivalents of metal per 100 grams of polymer, chromium (III) 2-ethylhexanoate produces the highest Mooney viscosity.

TABLE V
THE EFFECT OF DIFFERENT METALS ON THE BULK VISCOSITY AND HOT MILL ADHESION OF A BLACK RUBBER MASTERBATCH[1]

| Metal Salt | Parts | Milli-equivalents | Sticking[2] | Mooney Viscosity |
|---|---|---|---|---|
| None | None | None | No | 20½ |
| Chromium (III) 2-ethylhexanoate | 1.0 | 3.2 | No | 34 |
| Cerium (III) 2-ethylhexanoate[4] | 1.4 | 1.8 | Yes | 12 |
| Cerium (III) 2-ethylhexanoate[4] | 2.7 | 3.5 | Yes | 29 |
| Cerium (III) 2-ethylhexanoate[4] | 6.2 | 8.0 | Yes | 48 |
| Zinc Oxide | 1.0 | 24.6 | Yes | 24 |
| Zinc 2,4-pentanedionate | 1.3 | 9.8 | Yes | 33 |
| Zinc 2-ethylhexanoate[5] | 2.0 | 11.0 | Yes | 32 |
| Magnesium oxide[6] | 1.0 | 49.6 | Yes | 23 |
| Nickel 2-ethylhexanoate[7] | 0.67 | 2.7 | Yes | 22 |
| " | 2.0 | 8.1 | Yes | 58 |
| Stannous 2-ethylhexanoate[8] | 0.67 | 3.2 | Yes | 23 |
| " | 1.3 | 6.1 | Yes | 39½ |
| " | 2.0 | 9.5 | No | 109 |
| Zirconium 2-ethylhexanoate[9] | 0.67 | 5.3 | Yes | 20½ |
| " | 1.3 | 10.2 | Yes | 32½ |
| " | 2.0 | 15.8 | No | 61 |
| Ferric 2-ethylhexanoate[10] | 0.67 | 3.8 | Yes | 26 |
| " | 1.3 | 7.3 | Yes | 48½ |
| " | 2.0 | 11.3 | No | 100 |
| Aluminum 2,4-pentanedionate | 0.47 | 4.2 | Yes | 30 |
| Aluminum octoate | 1.0 | 6.7 | Yes | 15 |

[1]Terpolymer contains, by wt., 42% ethylene, 54% methyl acrylate and 4% monoethyl maleate. Acid content is approximately 35 meq/100 g of polymer.
[2]Mill temperature of 125° C.
[3]Contains 5.5% by weight of chromium.
[4]Contains 6% by weight of cerium.
[5]Contains 18% by weight of zinc
[6]Commercial grade, sold as "Maglite" D by C. P. Hall, Co, Tenn.
[7]Contains 12% by weight of nickel.
[8]Commercial grade, sold as "M&T" Catalyst T-9, containing 28% by weight of tin.
[9]Contains 17% by weight of zirconium.
[10]Contains 10.5% by weight of iron.

EXAMPLE 6

The mill behavior and bulk viscosities at 100° C. of several carboxylic acid-containing ethylene copolymers were examined, and the effect of treatment of the polymers with chromium (III) 2-ethylhexanoate, magnesium stearate, and zirconium 2-ethylhexanoate was observed. The polymers were produced by a high pressure bulk polymerization technique and are characterized in Table VI.

TABLE VI
CHARACTERIZATION OF ETHYLENE COPOLYMERS

| Polymer (abbreviation) | Melt Index at 190° C. (g/10 min.) | Co-monomer | Weight % in Polymer |
|---|---|---|---|
| Ethylene/methyl acrylate/carbon monoxide/ethyl hydrogen maleate (E/MA/CO/MAME) | 43 | ethylene | 63 |
| | | methyl acrylate | 26 |
| | | carbon monoxide | 5 |
| | | ethyl hydrogen maleate | 6 |
| Ethylene/vinyl acetate/methacrylic acid (E/VA/MAA) | 47 | ethylene | 66 |
| | | vinyl acetate | 29 |
| | | methacrylic acid | 5 |
| Ethylene/vinyl acetate/ethyl hydrogen maleate (E/VA/MAME) | 95 | ethylene | 68 |
| | | vinyl acetate | 30 |
| | | ethyl hydrogen maleate | 2 |
| Ethylene/methyl acrylate/ethyl hydrogen maleate (E/VA/MAME) | 9 | ethylene | 42 |
| | | methyl acrylate | 54 |
| | | ethyl hydrogen maleate | 4 |

The untreated copolymers were banded onto a 2-roll 3"×6" rubber mill heated to 100° C. and held there for a period of 5 minutes. The ability to make diagonal cuts through the hot banded polymer and produce flaps of material to be folded over on the mill (to mix the stock) was noted. The ability to remove the stock at the mill temperature of 100° C. was also observed. The designation "sticking" was assigned to those stocks for which flaps could not be made and which could not be removed without some cooling of the mill.

The copolymers were also treated with metal salts, heated on the mill at 100° C. for 5 minutes, and then examined for "sticking" behavior and bulk viscosity. The "sticking" and viscosity data are given in Table VII. The quantity of metal is given in milliequivalents of metal per 100 grams of polymer.

Metal Salt Treatments:
E/MA/CO/MAME

A 50 g portion of polymer was banded onto the mill and treated with 0.5 g of chromium (III) 2-ethylhexanoate (8% by wt. of chromium) at room temperature.

Another 50 g portion of polymer was treated similarly at room temperature with 0.7 g of magnesium stearate.

Another 40 g portion of polymer was treated similarly at room temperature with 0.4 g of zirconium 2-ethylhexanoate (17% by weight of zirconium).

E/VA/MAA

A 50 g portion of polymer was banded onto the mill at 60°-70° C. and cooled to room temperature for the addition of 1.5 g of chromium (III) 2-ethylhexanoate (8% by wt. of Cr).

Another 50 g portion of polymer was treated similarly with 0.7 g of magnesium stearate. The stock was then heated to 100° C. but was sticky and had to be removed by scraping the mill. An additional 1.4 g of magnesium stearate (2.1 g total) was added at room temperature.

Another 50 g portion of polymer was banded onto the mill at 60°-70° C., cooled to 50° C. and treated with 1.5 g of zirconium 2-ethylhexanoate (17% by wt. of zirconium).

E/VA/MAME

A 40 g portion of polymer was treated with 0.4 g of chromium (III) 2-ethylhexanoate (8% by wt. of chromium) on a mill heated to 65° C. The stock was sticky at 65° C. and 100° C., and was held for 5 minutes at the higher temperature. Another 0.4 g of chromium salt was added, the stock heated to 100° C., and finally another 0.4 g of salt (1.2 g total) was added at 60° C.

Another 40 g portion of polymer was treated at 60° C. with 1.6 g of zirconium 2-ethylhexanoate (17% by wt. of zirconium).

E/MA/MAME

A 50 g portion of polymer was banded onto a 2-roll mill at room temperature and treated with 0.2 g of chromium (III) 2-ethylhexanoate (8% by wt. of chromium).

Another 50 g portion was treated similarly with 0.7 g of zirconium 2-ethylhexanoate (17% by wt. of zirconium).

TABLE VII

THE EFFECT OF METAL SALTS ON THE BULK VISCOSITY AND HOT MILL ADHESION OF SEVERAL ACID-CONTAINING ETHYLENE COPOLYMERS

| Polymer | Metal Salt | Milliequivalents | Sticking[1] | Mooney Viscosity |
|---|---|---|---|---|
| E/MA/CO/MAME | None | — | Yes | 1 |
| | Chromium (III) 2-ethylhexanoate[2] | 4.6 | No | 57 |
| | Zirconium 2-ethylhexanoate[3] | 7.6 | Yes | 13½ |
| | Magnesium stearate | 4.8 | Yes | 6 |
| E/VA/MAA | None | — | Yes | 4 |
| | Chromium (III) 2-ethylhexanoate[2] | 14 | No | 74 |
| | Zirconium 2-ethylhexanoate[3] | 23 | No | 46 |
| | Magnesium stearate | 14 | Yes | 16 |
| E/VA/MAME | None | — | Yes | 1 |
| | Chromium (III) 2-ethylhexanoate[2] | 14 | No | 86 |
| | Zirconium 2-ethylhexanoate[3] | 30 | Yes | 28½ |
| E/MA/MAME | None | — | Yes | 19 |
| | Chromium (III) 2-ethylhexanoate[2] | 1.8 | No | 61 |
| | Zirconium 2-ethylhexanoate[3] | 10 | Yes | 33½ |

[1]Mill temperature of 100° C.
[2]Contains 8% by weight of chromium.
[3]Contains 17% by weight of zirconium.

EXAMPLE 7

This example illustrates the use of chromium (III) salts falling outside this invention. Chromium (III) 2-ethylhexanoate is included as a control.

The black rubber masterbatch described in Example 1 was treated with various chromium (III) salts by mixing on a 2-roll rubber mill at room temperature. Aqueous solutions and suspensions were added to the masterbatch which was banded on the mill heated to 60° C. The stocks were then held for 5 min. on the mill, heated to 125° C., to effect a chemical reaction.

In Table VIII, the effect on bulk viscosity, i.e., Mooney Viscosity ($ML_{1+4}$ at 100° C.) and adhesion of the masterbatch is noted. The ability to make diagonal cuts through the hot banded polymer and produce flaps of material to be folded over on the mill to mix the stock was noted. The ability to remove the stock at the mill temperature of 125° C. was also observed. The designation "sticking" was assigned to those stocks for which flaps could not be made and which could not be removed without some cooling of the mill. The quantity of chromium is given in parts per 100 parts of polymer and milliequivalents per 100 grams of polymer.

It can be seen that many chromium (III) compounds are ineffective in that they fail to prevent sticking while achieving only the desired increase in viscosity. In certain instances sticking does disappear if the level of chromium is increased to such a point that the viscosity reaches an impractically high level.

TABLE VIII

EFFECT OF DIFFERENT CHROMIUM (III) COMPOUNDS ON MASTERBATCH[1] VISCOSITY AND HOT MILL ADHESION

| Cr (III) Compound | Parts | Milliequivalents | Sticking[2] | Mooney Viscosity |
|---|---|---|---|---|
| Chromium (III) 2-ethylhexanoate[3] | 0.56 | 2.6 | No | 38 |
| $CrCl_3 \cdot 6 H_2O$ | 0.33 | 3.9 | Yes | 21 |
| " | 0.67 | 7.7 | Yes | 37½ |
| " | 1.0 | 11.2 | No | 100 |
| Methacrylato chromic chloride[4] | 2.3 | 8.1 | Yes | 66 |
| Methacrylato chromic chloride[4] | 3.3 | 11.6 | No | 112 |

TABLE VIII-continued
EFFECT OF DIFFERENT CHROMIUM (III) COMPOUNDS ON MASTERBATCH[1] VISCOSITY AND HOT MILL ADHESION

| Cr (III) Compound | Parts | Milli-equivalents | Sticking[2] | Mooney Viscosity |
|---|---|---|---|---|
| Stearato chromic chloride[5] | | | | |
| Stearato chromic chloride[5] | 2.3 | 7.7 | Yes | 40 |
| | 3.3 | 11.6 | No | 106 |
| Chromium benzoylacetonate | 1.5 | 8.1 | No | 16½ |
| CrBr$_3$ . 6 H$_2$O | 1.7 | 13.0 | Yes | 39 |
| Cr$_2$(CO$_3$)$_3$[6] | 1.2 | 25.3 | No | 20 |
| Cr(OH)$_3$[6] | 1.2 | 35.0 | No | 19 |
| Cr$_2$(SO$_4$)$_3$ . n H$_2$O[7] | 1.0 | 11.9 | No | 19 |

[1]Terpolymer contains, by weight, 42% ethylene, 54% methylacrylate, and 4% monoethyl maleate. The acid content is approximately 35 meq./100 g of polymer.
[2]Mill temperature of 125° C.
[3]Contains 8 weight percent of chromium
[4]Sold commercially by Du Pont as "Volan" chromium complex. Contains 6% by weight of chromium.
[5]Sold commercially by Du Pont as "Quilon" S bonding agent. Contains 6% by weight of chromium.
[6]Aqueous suspension—1.0 g compound per 5 ml H$_2$O.
[7]Solid contains 21% by weight of chromium. An aqueous solution of ca. 10% concentration was used.

Industrial Applicability

The elastomeric polymers of the present invention can be used in substantially the same industrial applications as can the elastomeric polymers of Greene, including ignition wire jacketing, spark plug boots, hose, belts, miscellaneous molded boots, seals, and gaskets. The good low and high temperature physical properties and excellent oil resistance made these elastomers particularly well suited for automotive applications.

Best Mode

Although the best mode of the present invention, i.e., the single best copolymer of the present invention, will depend upon the particular desired end use and the specific requisite combination of properties for that use, the single most preferred composition of the present invention is that described in detail in Example 3 as polymer B.

I claim:

1. An elastomeric copolymer derived from component monomers comprising:
   (a) 25-70 weight percent ethylene,
   (b) 25-70 weight percent of at least one compound selected from the group consisting of C$_1$-C$_8$ alkyl esters of acrylic acid and vinyl esters of C$_2$-C$_8$ carboxylic acids, and
   (c) at least one α,β-unsaturated carboxylic acid of 3-12 carbon atoms selected from the group consisting of monocarboxylic acid, dicarboxylic acids and monoesters of dicarboxylic acids, in an amount to provide 0.1-10 weight percent of —COOH groups, which has been modified by incorporating therein component
   (d) 1-20 milliequivalents per 100 grams of copolymer of at least one chromium (III) compound selected from the group consisting of chromium (III) carboxylates of the formula (RCOO)$_3$Cr where R is an acyclic alkyl group of 1-20 carbon atoms or an acyclic alkenyl group of 3-20 carbon atoms in which the α-carbon is saturated, and tris(2'-hydroxyacetophenono) chromium.

2. A copolymer of claim 1 derived from component monomers further comprising up to 15 weight percent of at least one additional monomer from the group consisting of carbon monoxide, sulfur dioxide and acrylonitrile.

3. A copolymer of claim 1 wherein the component (a) comprises 35-65 weight percent of the polymer.

4. A copolymer of claim 1 wherein the component (b) comprises 30-60 weight percent of the polymer.

5. A copolymer of claim 1 wherein the component (c) comprises an amount sufficient to provide 0.5-5.0 weight percent of —COOH groups in the polymer.

6. A copolymer of claim 1 wherein the component (d) comprises 1-7 milliequivalents per 100 grams of the polymer.

7. A copolymer of claim 1 wherein the component (a) comprises 35-65 weight percent of the polymer, the component (b) comprises 30-60 weight percent of the polymer, the component (c) comprises an amount sufficient to provide 0.5-5.0 weight percent of —COOH groups in the polymer, and the component (d) comprises 1-7 milliequivalents per 100 grams of the polymer.

8. A copolymer of claim 4 wherein the component (b) is selected from the group consisting of methyl acrylate, ethyl acrylate and vinyl acetate.

9. A copolymer of claim 8 wherein the component (b) is methyl acrylate.

10. A copolymer of claim 5 wherein the component (c) is selected from the group consisting of acrylic acid, methacrylic acid and ethyl hydrogen maleate.

11. A copolymer of claim 10 wherein the component (c) is ethyl hydrogen maleate.

12. A polymer of claim 6 wherein the component (d) is selected from the group consisting of chromium (III) 2-ethylhexanoate, chromium (III) oleate and chromium (III) neodecanoate.

13. A polymer of claim 12 wherein the component (d) is chromium (III) 2-ethylhexanoate.

14. A polymer of claim 7 wherein the component (b) is methyl acrylate, the component (c) is ethyl hydrogen maleate, and the component (d) is chromium (III) 2-ethylhexanoate.

15. A polymer of claim 14 wherein the ethylene comprises 35-47 weight percent of the polymer, the methyl acrylate comprises 50-60 weight percent of the polymer, the ethyl hydrogen maleate comprises 3-5 weight percent of the polymer, and the chromium (III) 2-ethylhexanoate comprises 1-7 milliequivalents per 100 grams of the polymer.

16. A process for preparing the elastomeric copolymer of claim 1 which comprises adding 1-20 milliequivalents per 100 grams of the polymer of at least one chromium (III) compound selected from the group consisting of chromium (III) carboxylates of the formula (RCOO)$_3$Cr where R is an acyclic alkyl group of 1-20 carbon atoms or an acyclic alkenyl group of 3-20 carbon atoms in which the α-carbon is saturated, and tris(2'-hydroxyacetopheno) chromium, to and mixing with an elastomeric copolymer derived from component monomers comprising:
   (a) 25-70 weight percent ethylene,
   (b) 25-70 weight percent of at least one compound selected from the group consisting of C$_1$-C$_8$ alkyl esters of acrylic acid and vinyl esters of $C_2$-$C_8$ carboxylic acids, and (c) at least one $\alpha,\beta$-unsaturated carboxylic acid of 3-12 carbon atoms selected from the group consisting of monocarboxylic acid, dicarboxylic acids and monoesters of dicarboxylic acids, in an amount to provide 0.1-10 weight percent of —COOH groups, under conditions such that the chromium (III) compound becomes substantially evenly distributed throughout the polymer before any substantial degree of chemical interaction between the chromium (III) compound and the polymer has occurred.

17. The process of claim 16 wherein the chromium (III) compound is chromium (III) 2-ethylhexanoate and comprises 1-7 milliequivalents per 100 grams of the polymer.

18. Vulcanizable composition made from the copolymer of claim 1.

19. Vulcanizable composition made from the copolymer of claim 15.

20. Vulcanized article made from the composition of claim 18.

21. Vulcanized article made from the composition of claim 19.

* * * * *